Figure 1:
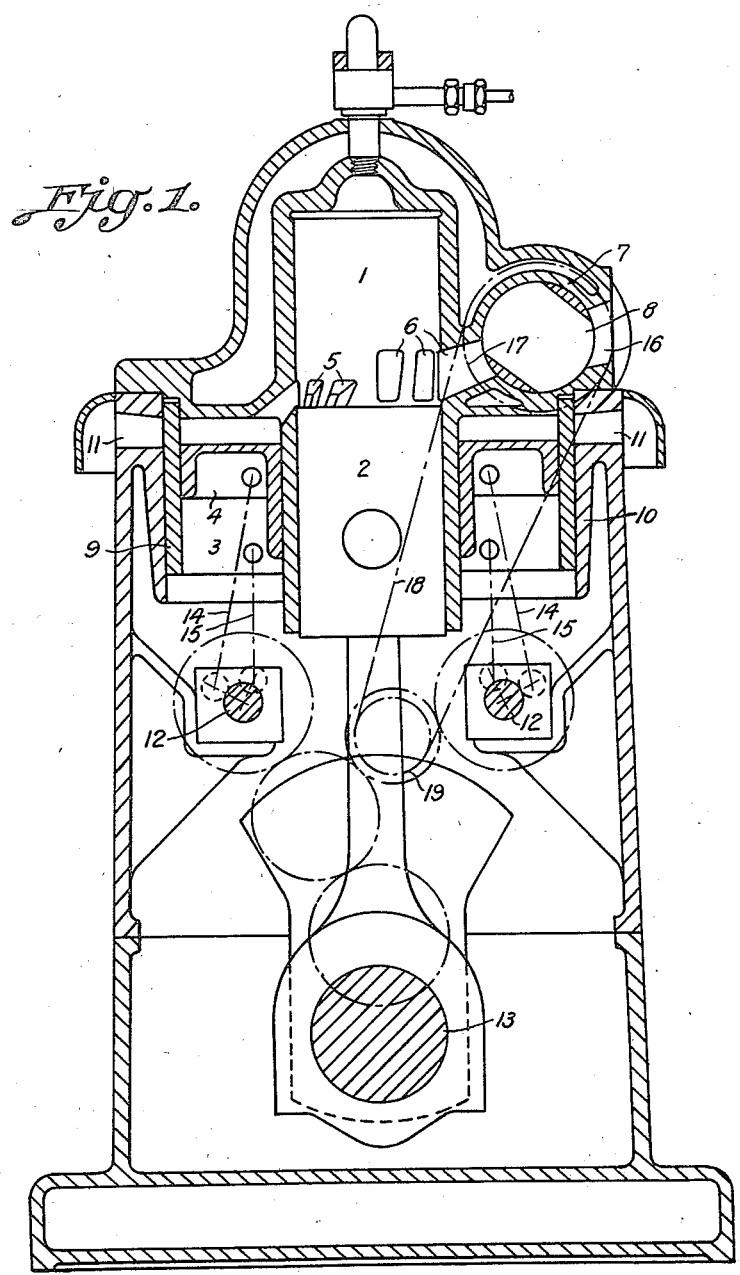

June 2, 1936.  D. G. MACKENZIE  2,042,722
INTERNAL COMBUSTION ENGINE OF THE TWO-STROKE TYPE
Filed July 16, 1934   5 Sheets-Sheet 1

INVENTOR.
D. G. MACKENZIE,
BY Carroll Bailey
ATTORNEY

INVENTOR.
D. G. MACKENZIE,
BY Carroll Bailey
ATTORNEY.

Patented June 2, 1936

2,042,722

UNITED STATES PATENT OFFICE 2,042,722

INTERNAL COMBUSTION ENGINE OF THE TWO-STROKE TYPE

Duncan Gordon Mackenzie, Ilford, England

Application July 16, 1934, Serial No. 735,455
In Great Britain June 12, 1933

8 Claims. (Cl. 123—71)

The invention relates to internal combustion engines working on the two-stroke cycle, whether the power cylinder or each of the power cylinders of an engine of this type is provided with a single piston or with a pair of opposed pistons, and further to engines of the kind above referred to which are provided with an annular pump chamber surrounding the power cylinder, and in which the exhaust and inlet ports of the power cylinder are, in the case of an engine of the single piston type, covered and uncovered by the power piston, or, in the case of engines of the opposed-piston type, one of the power pistons covers and uncovers the exhaust ports whilst the other power piston covers and uncovers the air inlet ports.

An object of the present invention is to provide a two-stroke cycle engine which is capable of maintaining a high mean effective pressure up to the highest operating speeds. This necessitates a thorough scavenging of the exhaust gases, the drawing of a full charge of air into the air pump, and the presence of a dense charge of pure air in the power cylinder at the beginning of the compression period. At the same time, the improved engine is capable of maintaining an economical fuel consumption at various loads and speeds. This necessitates low pumping losses in the air pump, and avoidance of waste of scavening air, the compression of which by the pump absorbs appreciable energy.

A further object of the present invention is to provide an improved mechanism for actuating the piston of the air pump, which will operate smoothly at high speeds.

A further object of the invention is to overcome the difficulty in engines of the above mentioned kinds of providing a sufficient lead to the exhaust to allow the pressure in the power cylinder to drop low enough to take full advantage of the air supplied for scavenging and combustion purposes, of providing for supercharging for high speeds and power, and of lowering the compression ratio for low power and idling.

The accompanying drawings illustrate, by way of example, ways in which the invention may be carried out in the cases both of engines of the single piston and the opposed-piston types and engines in which fuel is injected into the power cylinder.

Figure 2:
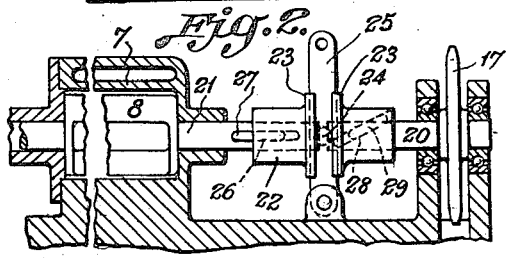
Figure 3:
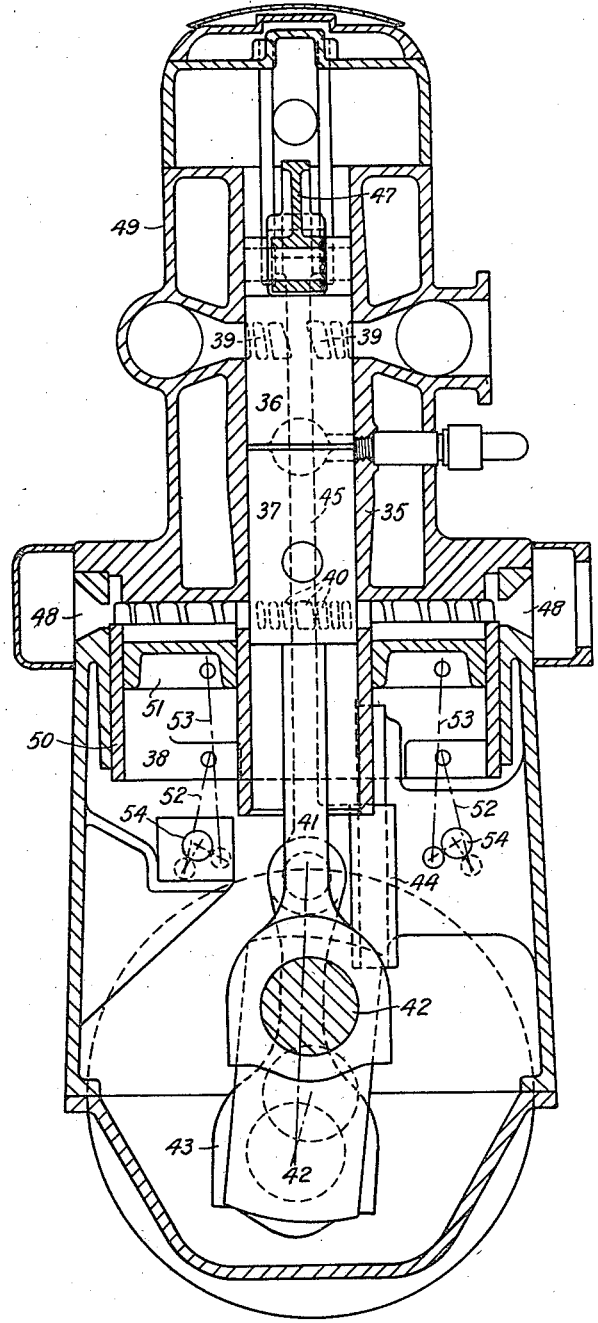
Figure 4:
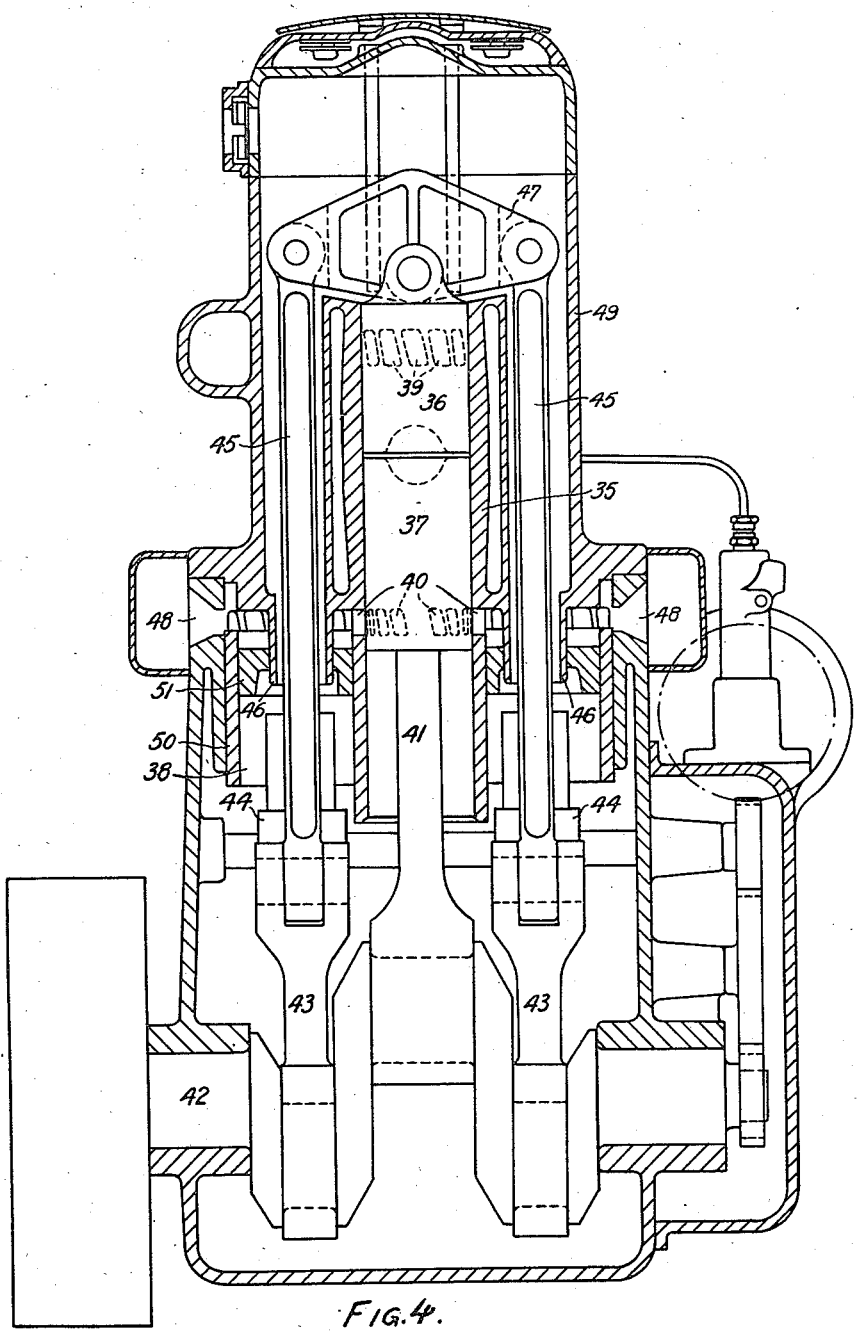
Figure 5:
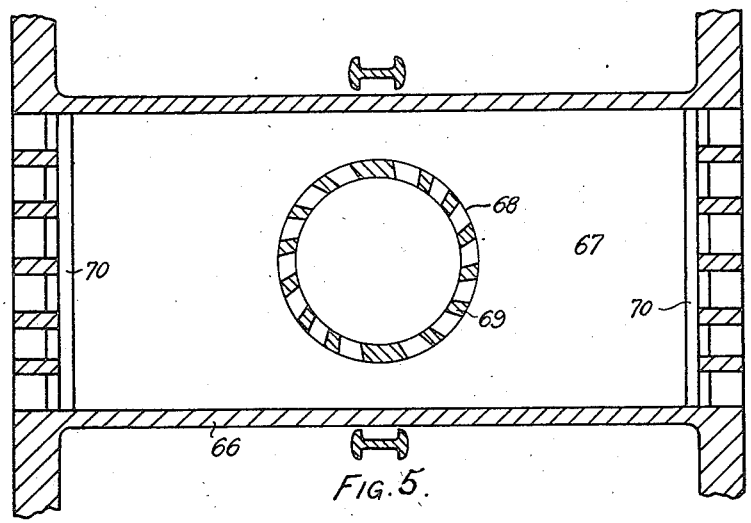
Figure 6:
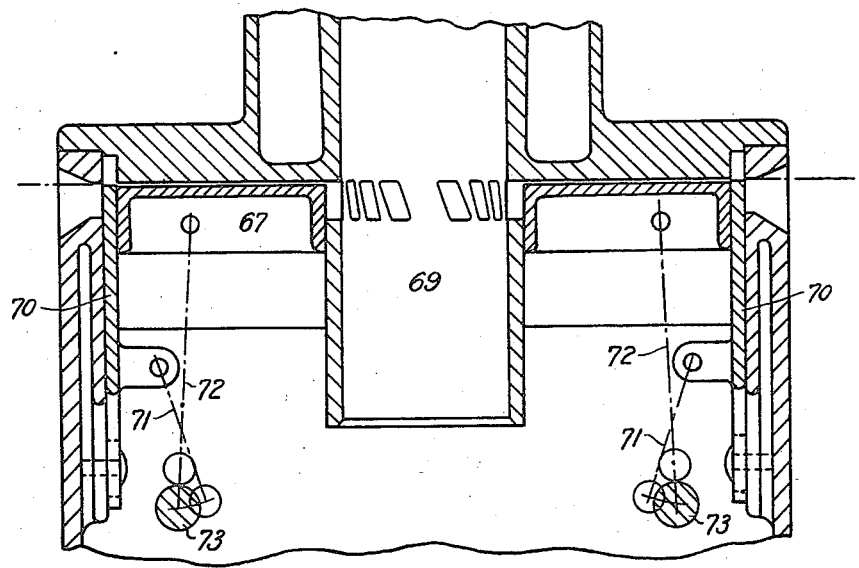
Figure 7:
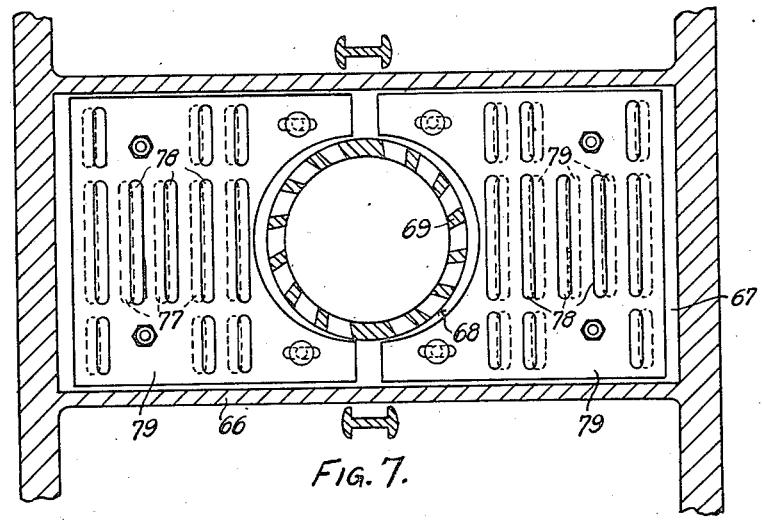
Figure 8:
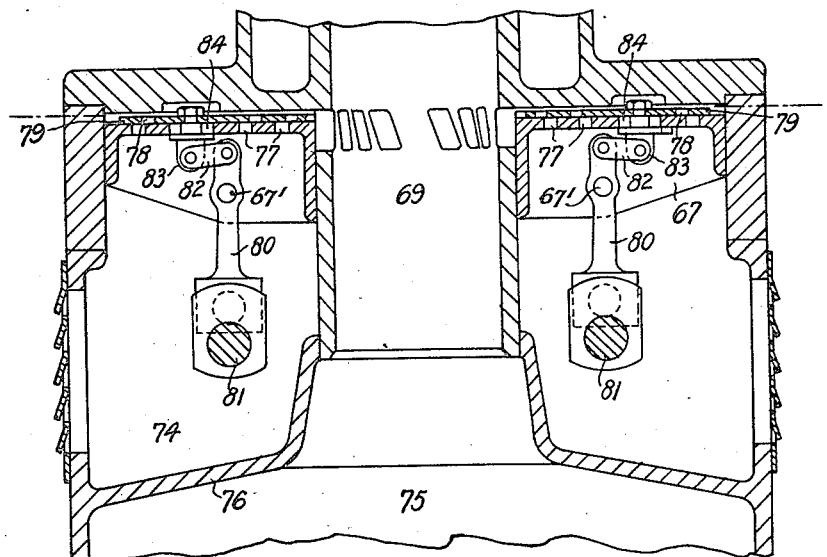

Fig. 1 is a vertical section of a single piston engine constructed in accordance with the invention and provided with a control valve for determining in conjunction with the power piston the exhaust period. Fig. 2, drawn to an enlarged scale, illustrates mechanism which may be employed if it is desired that the timing of said control valve shall be adjusted so as to admit of varying compression volumes in the power cylinder. Figs. 3 and 4 are vertical sections, taken at right angles to one another, illustrating an engine of the opposed-piston type constructed in accordance with the invention. Figs. 5 and 6 are horizontal and vertical sections and Figs. 7 and 8 are sections corresponding to Figs. 5 and 6, all drawn to an enlarged scale, illustrating the lower part of modified forms of engines of the opposed-piston type constructed in accordance with the invention and provided with alternative forms of air pump, and also illustrating means which may, for example, be employed for controlling the admission of air to said air pump and for actuating the piston of the air pump.

Referring first to the embodiment of the invention illustrated by Fig. 1 and to the mechanism shown in Fig. 2, a two-stroke internal combustion engine of the single piston type according to the present invention comprises a power cylinder 1, a piston 2 reciprocating in the cylinder 1, an annular air pump cylinder 3 surrounding the lower part of the power cylinder 1, and an annular piston 4 working between the cylinders 1 and 3. The power cylinder 1 is provided at its lower end with inlet ports 5 for the admission into the power cylinder 1 of the air delivered by the piston 4 of the air pump 3, and opposite the air inlet ports 5 with exhaust ports 6 which terminate in the housing 7 of a control valve 8, hereinafter more fully referred to, which is adapted to determine the exhaust period. These sets of ports 5 and 6 are uncovered and covered, i. e., opened and closed, by the power piston 2 of the engine. The cylinder of the air pump may, as shown, be constituted by the outer walls of the lower part of the power cylinder 1 and by a sleeve 9 disposed concentric with said outer walls and forming a liner for the outer part of the air pump cylinder, in which case the piston of the pump reciprocates in the liner. Alternatively the sleeve may be arranged to work on the outer walls of the air pump cylinder, the piston of the air pump then reciprocating in the cylinder of the pump. The part of the outer casting 10 in which the sleeve 9 reciprocates is provided with a port or ports, preferably with a series of ports 11, communicating with the atmosphere and surrounding or partly surrounding the upper end of the cylinder of the air pump 3, through which ports 11 air is drawn into said cylinder during the downward or suction stroke of the air pump, the opening and closing of the ports being determined by suitable movements imparted to the sleeve 9. The movements imparted to the piston 4 of the air pump and to the sleeve 9 may, as shown, be effected through the medium of two auxiliary crank shafts 12 geared to the main crank shaft 13 of the engine by the train of gear wheels shown diagrammatically in Fig. 1, whereby they are constrained to rotate at equal speeds in opposite directions, and of rods 14 and 15 connected to the piston 4 of the air pump and to the sleeve 9 and to the auxiliary crank shafts 12, the throws of the latter being so set or timed with respect to each other that the inlets ports 11 of the air pump are uncovered as the piston 4 of the air pump descends on its suction stroke and are closed as said piston commences its upward or delivery stroke. By the above described arrangements of parts it is possible to provide very large areas for the admission of air into the cylinder of the air pump, thus ensuring a maximum supply of air during each suction stroke of the air pump, whilst as only a space sufficient for safe clearance may obtain between the upper end of the cylinder of the air pump and the top of the piston of the pump when the piston reaches the end of its upward or delivery stroke what practically amounts to the whole of the air drawn into the air pump will be delivered into the power cylinder. Moreover as the movements of the power piston of the engine and the piston of the air pump are so timed that the air inlet ports of the power cylinder of the engine will when the piston of the air pump completes its delivery stroke, have only just been closed by the power piston air will be delivered to the power cylinder against a minimum of resistance during the whole of the time that said inlet ports are uncovered by the power piston.

In order to obtain the greatest efficiency of the scavenging air, more especially at high speed and power output, it is of the utmost importance that the power cylinder of an engine shall be full of clean air after each working stroke. To obtain this result an appreciable time must elapse after the exhaust ports of the power cylinder have been uncovered to allow the pressure in the power cylinder of an engine to drop low enough before the air inlet ports of the cylinder are uncovered to prevent exhaust gases entering the cylinder of the air pump. But since these two sets of ports are uncovered by the same power piston it follows that whatever lead is given to the exhaust to open before the air inlet ports of the power cylinder are uncovered the exhaust ports of the latter will for the same period of lap remain open after the air inlet ports are closed, with the result that part of the fresh charge of air for combustion will be expelled before the exhaust ports are covered.

According to the invention this loss of compression air is prevented by the use of a control valve 8, hereinbefore referred to, which is adapted to determine in conjunction with the power piston 2 the exhaust period. This valve 8, which is preferably of cylindrical form, is disposed in a housing 7 in the outer casting 10 of the engine adjacent to the exhaust ports 6 of the power cylinder 1 and intermediate said ports and the exhaust outlet 16 of the engine. The valve 8 is rotated from the main crank shaft 13 of the engine by any suitable mechanism, such, for instance, as chain gearing consisting of a chain wheel 17 fixed to the spindle of the valve, and a chain 18 engaging with the chain wheel 17 and with a chain wheel 19 that is rotated from said crank shaft 13. The valve 8 is of such formation and is so timed with respect to the power piston 2 of the engine as to establish and cut off, at the required times, communication between the exhaust ports 6 of the power cylinder 1 and the exhaust outlet 16. The valve may be fixed to its spindle or may be provided with mechanism by which its relative position to the exhaust ports 6 can be altered at will so as to admit of varying compression volumes. For instance it may be moved to maintain communication with the exhaust outlet 16 until the exhaust ports 6 of the power cylinder 1 are just covered by the power piston 2 on the compression stroke, so as to allow combustion air to be expelled up to that time, thus enabling an engine to idle at a lower speed than would be possible if full compression obtained. From the foregoing it will be appreciated that the valve is only exposed to the contents of the power cylinder whilst air is being delivered into the latter and for a short part of the compression stroke, after which the exhaust ports are again covered by the power piston. The valve is therefore immune from burning and high pressure. It can be so proportioned and timed that it can be continuously rotated at half engine speed. When it is desired that the position of the valve 8 relative to the exhaust ports 6 of the power cylinder shall be adjustable to allow of varying compression volumes in said cylinder the parts illustrated by Fig. 2 may be employed. As will be seen from this figure a spindle 20 of short length to which is secured the chain wheel 17, forming a part of the gearing by which the valve 8 is rotated from the main crank shaft 13 of the engine, is arranged in line with the spindle 21 of the valve 8 and a sleeve 22 is mounted on the contiguous parts of the spindles 20 and 21. This sleeve 22 is provided at its center with a pair of flanges 23 adapted to cooperate with a pin 24 fixed to a pivoted lever 25 and is formed on opposite sides of said flanges 23 with two grooves, a groove 26 engaging with a horizontally disposed feather 27 secured to the spindle 21 of the valve, and a groove 28 engaging with an angularly disposed feather 29 fixed to the spindle 20. From the above description and an inspection of Fig. 2, it will be readily appreciated that movement, by a manually operated rod or otherwise, of the pivoted lever 25 to either side of its central or neutral position will result in the valve 8 being moved in a forward or a backward direction. As will be readily understood instead of an engine being provided with a single control valve adapted to operate as described above, two or more such control valves may be used, these valves being either continuously rotated, reciprocated or oscillated.

Referring now to Figs. 3 and 4 an engine of the opposed-piston type when constructed in accordance with the invention may comprise a power cylinder 35 which is open at both of its ends, two pistons 36 and 37 working in said cylinder 35, and an annular air pump 38 which surrounds the lower end of the power cylinder 35 and is similar in all respects to the air pump described above in connection with single piston engines. The power cylinder 35 is provided at a suitable distance from its upper end with exhaust ports 39, adapted to cooperate with the upper power piston 36, and at a suitable distance from its lower end with air inlet ports 40 which communicate directly with the upper end of the cylinder of the air pump 38 and are controlled by the lower power piston 37. The lower power piston 37, as usual in this type of engine, is connected by a rod 41 to the central throw of a three-throw crank shaft 42, the main crank shaft of the engine, whilst the upper power piston 36 is connected to the other two or outer throws of said crank shaft by suitable mechanism such, for instance, as rods 43 of relatively short length which are connected at their lower ends to said outer throws of the crank shaft 42 and at their upper ends to suitable guided slides 44, and vertically disposed rods 45 which are connected at their lower ends to the slides 44 and, after passing through tubes 46 provided therefor in the air pump 38, are connected at their upper ends to a crosshead 47 which is fixed to or, as shown, is pivotally mounted at its center on the upper power piston 36.

In the case of this engine control of the times when the exhaust ports 39 and the air inlet ports 40 of the power cylinder 35 are opened and closed is determined by giving to the side throws of the crank shaft 42 of the engine a suitable lead in advance of the central throw of the crank shaft, so as, as in the case of a single piston engine, to give sufficient time to allow the exhaust pressure in the power cylinder 35 to fall to the desired extent before the air inlet ports 40 of the cylinder are uncovered by the lower power piston 37 and to cover the exhaust ports 39 at any desired period before the inlet ports 40 are covered by the lower power piston 37, or for both sets of ports to be covered at the same time on the compression stroke.

Any suitable means may be provided for controlling the admission of air to the cylinder of the air pump of an engine of the opposed-piston type. For instance, as shown in Figs. 3 and 4, said air may, as in the case of a single piston engine, see Fig. 1, be admitted to the engine through ports 48 formed in the outer casting 49 of the engine and communicating at their outer ends with the atmosphere, and these ports 48 be opened and closed at the required times by means of a reciprocatory sleeve 50 disposed concentric with the lower part of the power cylinder 35, while said sleeve 50 and the piston 51 of the air pump may be actuated by means of rods 52 and 53 connected to the sleeve and the piston and to cranks on auxiliary crank shafts 54 driven from the main crank shaft of the engine.

The above described mechanism and other parts employed in carrying out the invention may be varied.

For instance, as shown in Figs. 5 and 6, and Figs. 7 and 8, the air pump of an engine constructed in accordance with the invention may consist of a rectangular chamber 66 fitted with a rectangular piston 67, said piston 67 being provided with a central cylindrical hole 68 adapted to move on the lower part of the power cylinder 69 of the engine. In this case the means for admitting air into the upper end of the chamber 66 of the air pump and the means for actuating the piston 67 from the main crank shaft of the engine may be of any suitable nature so long as air is admitted to the air pump at the proper times and the mechanism by which the piston 67 is reciprocated will allow the movements of the piston 67 to be suitably timed with respect to the power piston associated with the air pump. For instance, as shown in Figs. 5 and 6, admission of air into the chamber 66 of the air pump may be controlled by means of slides 70, and these slides 70 and the piston 67 be reciprocated by means of rods 71 and 72, connected to auxiliary crank shafts 73 which are geared to the main crank shaft of the engine.

Or, as shown in Figs. 7 and 8, air to be used in the air pump may be supplied from a chamber 74 which is disposed below the air pump and is separated from the crank chamber 75 of the engine by a transverse partition 76, the necessary amount of air from the chamber 74 being allowed during the downward stroke of the piston 67 to pass into the upper part of the chamber 66 of the air pump through slots 77 formed in the head of the piston 67 and through corresponding slots 78 in either a plate or, as shown, a pair of plates 79 which are slidably mounted on the head of the piston 67. The necessary movements are imparted to the slotted plates 79 and to the piston 67 by any suitable mechanism. Such mechanism may, as shown, consist of connecting rods 80 which are journalled on auxiliary crank shafts 81, actuated from the main crank of the engine (in the same way as the auxiliary shafts 12 are actuated in the example shown in Fig. 1), and are connected intermediate their ends to the piston 67 by pins 67'. The upper ends of the rods 80 are pivotally connected to short links 82 that are in their turn pivotally connected to downwardly projecting lugs 83 which are fixed to the slotted plates 79 and pass through slots 84 formed in the head of the piston 67. The above described rectangular chamber and piston, which would be of advantage where overall dimensions are a consideration, may also be used in the case of single piston engines.

Although the invention has been described in its application to single cylinder engines it is to be understood that the invention is equally applicable to multi-cylinder engines and to engines of types other than vertical.

What I have invented and desire to secure by Letters Patent of the United States is as follows:—

1. An internal combustion engine of the two-stroke type comprising a power cylinder, a piston working in said power cylinder and operating the main crank shaft of the engine, air inlet and exhaust ports in the walls of said power cylinder adapted to be covered and uncovered by said piston, an air chamber surrounding the lower part of said power cylinder, ports leading directly from the upper end of said rectangular chamber to said power cylinder, a piston working in said air pump chamber and operated from the main crank shaft of the engine, an air supply chamber disposed below said air pump and separate from the crank chamber of the engine, and means for controlling the passage of air from said air supply chamber to the upper end of the chamber of said air pump, said means comprising a plate or plates slidably mounted on the head of the piston of said air pump and operated from the main crank shaft, and slots formed in said plate or plates and in the head of said piston, substantially as described.

2. In an internal combustion engine, a cylinder, and pump means for the supply of air to said cylinder, said pump means comprising a chamber, a piston reciprocal therein and having air ports in the head thereof, a valve plate slidably mounted on the head of said piston and having ports therein for cooperation with the piston ports, a driving crank, a rod connected at one end with said crank and connected at a point inwardly of its other end with the piston, and a connection between the last mentioned end of said rod and said valve plate, whereby the plate is shifted relative to the piston simultaneously with reciprocation of the piston.

3. An internal combustion engine of the two-stroke type comprising a power cylinder, a crankshaft, a piston working in said cylinder and drivably connected with said crank-shaft, the power cylinder having a piston coverable and uncoverable inlet port and a piston coverable and uncoverable exhaust port, the exhaust port being disposed to be uncovered before said inlet port is uncovered during a power stroke, an air pump cylinder surrounding said power cylinder and communicating at all times directly and uninterruptedly with said inlet port, the inner wall of said air pump cylinder being comprised by the wall of said power cylinder, a pump piston separate from the power piston working between said pump cylinder and said power cylinder and drivably connected with said crank-shaft, a valve for controlling the admission of air to said pump cylinder, means drivably connected with said crankshaft for keeping said valve open during substantially the whole of the suction stroke of said air pump piston, and an engine operated valve co-operating with said exhaust port and serving to close the same in advance of piston closing thereof, the angular relationship of the connections of the pump piston and the power piston with the crank shaft being such that the pump piston reaches the end of its air delivery stroke substantially at the instant when the inlet port to the cylinder is covered by the power piston during its compression stroke.

4. An internal combustion engine of the two-stroke type comprising a power cylinder, a crank-shaft, a piston working in said cylinder and drivably connected with said crank-shaft, the power cylinder having a piston coverable and uncoverable inlet port and a piston coverable and uncoverable exhaust port, the exhaust port being disposed to be uncovered before said inlet port during a power stroke, an air pump cylinder surrounding said power cylinder and having at all times short, direct uninterrupted communication with said inlet port, the inner wall of said air pump cylinder being comprised by the wall of said power cylinder, a pump piston working between said pump cylinder and said power cylinder and drivably connected with said crank-shaft, a valve mechanically operated from said crankshaft for controlling the admission of air to said pump cylinder, and a valve mechanically operated from said crank-shaft, co-operating with said exhaust port and serving to close the same in advance of piston closing thereof, the angular relationship of the connections of the pump piston and the power piston with the crank shaft being such that the pump piston reaches the end of its air delivery stroke substantially at the instant when the inlet part to the cylinder is covered by the power piston during its compression stroke.

5. In an internal combustion engine of the two-stroke type having a power cylinder, a power piston working therein, a crank chamber, a crank-shaft housed in said chamber, a driving connection between said power piston and said crank-shaft, a pump cylinder surrounding said power cylinder, a pump piston working between said power cylinder and said pump cylinder, an air supply chamber separate from the crank chamber disposed between said pump cylinder and said crank-chamber, the head of said pump piston having a port therein, a valve plate slidably mounted on said piston head and cooperating with said port, a connecting rod pivotally attached to said pump piston and operatively connected with said crank-shaft, and a pivotal connection between said connecting rod and said valve plate whereby the pivotal motion of said connecting rod serves to reciprocate said valve plate.

6. In an internal combustion engine of the two-stroke type having a crank shaft, a power cylinder, a power piston working therein and drivably connected to said crank-shaft, a pump cylinder surrounding said power cylinder, and a pump piston working between said power cylinder and said pump cylinder, a balanced actuating mechanism for said pump piston comprising two auxiliary shafts disposed parallel to said crank-shaft, one on each side of the axis of said power cylinder, connecting rods excentrically journalled on said auxiliary shafts respectively and pivotally connected to said pump piston, and a driving connection between said auxiliary shafts and said crank-shaft for imparting to said auxiliary shafts angular displacements of equal amounts in opposite directions.

7. In an internal combustion engine as set forth in claim 6, a valve mechanism actuated by the auxiliary shafts for controlling the admission of air to the pump cylinder.

8. An internal combustion engine of the two-stroke type comprising a power cylinder having a piston coverable and uncoverable inlet port and a piston coverable and uncoverable exhaust port, said exhaust port being disposed to be uncovered before said inlet port during a power stroke, an air pump cylinder surrounding said power cylinder and cooperating therewith to form an annular air pump chamber, said air pump cylinder communicating at all times directly and uninterruptedly with said inlet port, a crank shaft, a power piston working in said power cylinder and operatively connected with said crank shaft, a pump piston separate from the power piston working in said air pump chamber and operatively connected with said crank shaft, the angular relationship of the connections between said pistons and said crank shaft being such that said pump piston reaches the end of its air delivery stroke substantially at the same instant that said inlet port is covered by the power piston during its compression stroke, said pump chamber having an air admission port, a mechanically operated valve for controlling the flow of air through said air admission port and arranged to remain open during substantially the whole of the suction stroke of said air pump piston, and means operatively connected with said crank-shaft for closing said exhaust port in advance of the closing of said inlet port.

DUNCAN GORDON MACKENZIE.